Jan. 26, 1971 R. I. MIZRAHI 3,557,445

METHOD OF FABRICATING SLANT CORES

Filed Jan. 2, 1968 3 Sheets-Sheet 1

INVENTOR.
RICHARD I. MIZRAHI
BY
John J. McCormack
ATTORNEY

METHOD OF FABRICATING SLANT CORES

Filed Jan. 2, 1968 3 Sheets-Sheet 2

INVENTOR
RICHARD I. MIZRAHI
BY
John J. McCormack
ATTORNEYS

METHOD OF FABRICATING SLANT CORES

Filed Jan. 2, 1968 3 Sheets-Sheet 3

INVENTOR.
RICHARD I. MIZRAHI
BY
John J. McCormack
ATTORNEY

United States Patent Office 3,557,445
Patented Jan. 26, 1971

3,557,445
METHOD OF FABRICATING SLANT CORES
Richard I. Mizrahi, Hawthorne, Calif., assignor to Honeywell, Inc., Minneapolis, Minn., a corporation of Delaware
Filed Jan. 2, 1968, Ser. No. 694,976
Int. Cl. H01f 7/66
U.S. Cl. 29—603 6 Claims

ABSTRACT OF THE DISCLOSURE

A digital magnetic recording core structure having the core-legs "slanted" with respect to the recording face thereof, this structure especially lending itself to manufacturing matched core sets from a common profile, yet doing so with improved convenience and efficiency, in a preferred embodiment, this arrangement (and method) being especially apt for fabricating one or a set of tunnel erase cores.

PROBLEMS, INVENTION FEATURES

Workers in the art of designing and fabricating magnetic heads, such as ferrite heads for digital magnetic recording have long recognized the difficulty in providing such a head without fussy, expensive manufacturing techniques which conventionally appear necessary to derive the required, extremely fine gap, superior high frequency performance, superior wear resistance, etc. One especial difficulty is the characteristic brittleness of the ferrite or like high resistivity materials for such cores which do not lend themselves to fine precision machining, lapping, etc. steps. Thus, it is an object of the invention to provide a new slanted or obliquely cantilevered core construction, allowing such manufacture and facilitating economical fabrication steps for producing sets of matched cores in quantity, yet with a high degree of precision finishing. A related object is to provide such a slanted core construction and associated methods for making cores which accommodate a more precise and less critical assembly procedure than has been prevalent heretofore, such as where individual cores are individually formed, machined, etc.

According to a rather basic, aspect of the invention, I propose: a technique for forming one or more cores by machining all magnetic "pole tip surfaces" before head assembly (either before leg-bonding or thereafter); preferably performing these steps in common on a "profile-piece" from which a matched set of cores may be derived. I then arrange the dicing (sawing) to separate each so-finished core from its parent profile block by a severing operation which affects (e.g. cuts) none of these "pole tip surfaces." An example is the 45° cut into the "pole-channels DC" of FIG. 7, these channels defining the recording surface on one side and the pole height on the other. This is a marked advantage, considering how, in the prior art, the severing or partitioning operation typically slices through one or more pole tip surfaces, such as the typical cut along the recording face to establish one or more recording gap widths. This is particularly undesirable where a number of matched cores are to be cut from a common profile and it is desired to keep the pole tip surfaces thereof aligned and also identically dimensioned—something more readily achieved by the machining operations with the invention, these being unrelated to the severing operation.

A related advantage is that the (slicing) saw-width errors resulting from variations in the thickness, alignment, etc. of a severing saw means which, being typically intended to establish the dimension, alignment, etc. of a pole tip surface like those aforementioned, can not frustrate this dimensional control. For instance, when slicing through a profile to establish gap-width thickness, anomalies or alignment jitter in the slicing saw cannot only misalign the orientation of a reference sliced surface, but also establish cutting-width variations which can build up from core to core as cores are successively severed. Workers in the art will recognize that the aforementioned advantages are multiplied when multi-gap cores are to be fabricated, alone or in sets. These advantages are further enhanced when one or more of the gap surfaces must be cut out in a particular unusual (non-flat) conformation. For instance, when a "tunnel groove" must be cut into a gap surface, such grooves are typically cut with individual saws after the core has been assembled, obviously leading to sizing and spacing discrepancies between cores in a set. Given the typical core orientation in the prior art, no particular advantage would result from making these grooves before core assembly either. However, with the slant (obliquely cantilevered) construction of cores per the invention, such a tunnel groove may be formed by simply making a single common cut for a matched set of cores.

Thus, it is an object of the present invention to provide the aforementioned advantages and other features, and to solve the aforementioned problems. A related object is to provide a novel "slanted" magnetic recording core structure and associated fabrication method. Another object is to provide such a structure and methods especially apt for machining fine indentations, such as tunneling indentations, or the like, with simple continuous machining strokes for one or several cores in a set.

The foregoing objects and features of advantage together with others will be appreciated better by those skilled in the art with reference to the following description of the preferred embodiments of the invention together with the accompanying drawings wherein like reference symbols denote like parts and wherein.

Figures 1, 7:
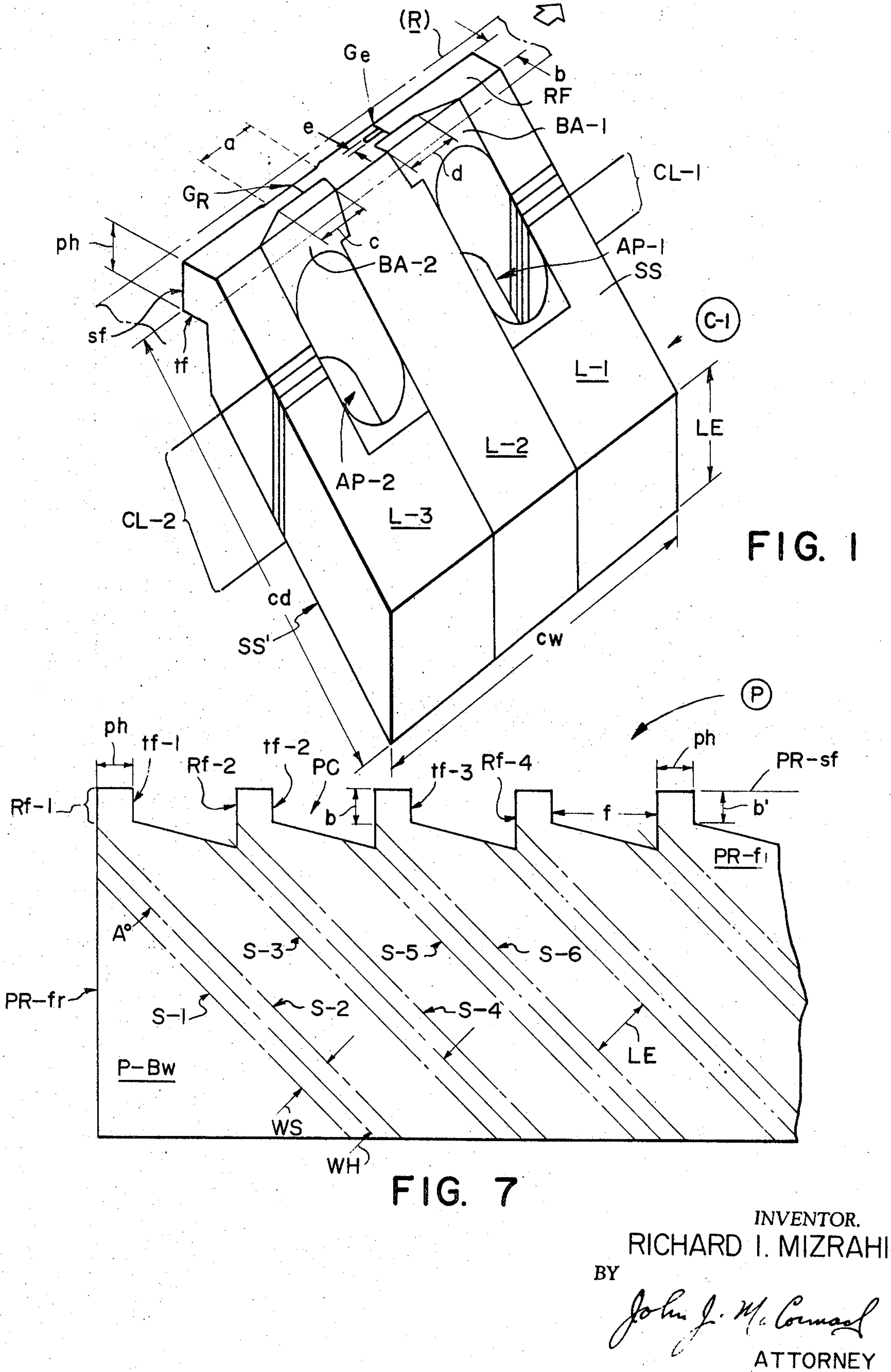
FIG. 1 is an idealized, isometric showing of a single core embodiment for a prescribed "tunnel-erase" magnetic recording head, according to the invention.
FIG. 7 is a very schematic plan view of one surface of the profile in FIG. 6 illustrating machining and slicing operations according to the invention.

In accordance with a preferred embodiment of the invention, FIG. 1 illustrates core C–1, a novel configuration for a magnetic recording transducer or ferrite core formed according to the invention as particularized below into a core C–1 which is "slanted" (obliquely cantilevered). Core C–1 happens to take the form of a dual gap type core having a somewhat conventional read-write gap $G_R$ as well as an erase gap $G_e$ of the longitudinal tunnel erasing (vs. transverse erasing) type. As appreciated by those skilled in the art and with reference to FIG. 2, it will be understood that core C–1 is adapted for magnetic recording along a particular recording track, the erase head conventionally establishing an erase pattern on the outer bounds of this track for conventional reasons (e.g. to establish a magnetic isolation zone, erase prior recordings there, etc.). More particularly, assuming magnetic recording surface R to be conventionally swept past the recording face RF of core C–1 (means not shown) and also assuming a background magnetic condition RR on the record prior to the subject recording by core C–1, it will be understood that as the record portions are swept initially past read/write gap $G_R$, an original track of recorded information RT–O will be understood as laid down; thereafter, the (double) erase gaps $G_e$, $G_e'$ laying down each an isolating erase track RE–1, R–2 respectively along the outer bounds of this original track to finally define a final recording track RT–F.

Core C–1 thus generally comprises a set of ferrite legs, namely a "common-leg" L–2, an outer read-write leg L–3 and an outer erase leg L–1. The dimensions of these elements and others associated with core C–1 and related cores are indicated below in Table I. As illustrated, a pair of coil apertures AP–1, AP–2 are provided to conventionally receive sense and excitation coil means such as exemplary coil CL–1 and CL–2, schematically indicated.

Legs L–3, L–2 meet to define read-write gap $G_R$ of particularly, very carefully defined (see below) cross-sectional dimensions with a spacer therebetween of prescribed thickness, etc. to define a particular type of recording as know in the art, being bonded together rigidly such as by a suitable bonding agent BA–2 (as known in the art).

Somewhat similarly, legs L–2, L–3 meet to define an erase gap $G_e$, $G_e'$ with a tunnel groove therebetween of prescribed width *e* being held by bonding agent BA–1 or the like as with BA–2. The cross section of legs L is cut through to establish a prescribed, oblique recording face RF finished to a carefully defined flatness as known in the art, preferably at about 45° to the elongate axis of the legs. (See below.) The legs are also cut out opposite face RF to establish a top pole face *tf* as indicated and to define a pole height (gap height *ph* of prescribed dimensions very, very carefully defined as known in the art). (Note above that the apertures AP extend to adjacent the gaps establishing a reduced area of lengths *d*, *c* respectively.) Core C–1 has a width *cw* and approximate length *cd* and a uniform thickness LE as described below. Core C–1 is also cut so that faces RF, *tf* terminate in a common side face *sf* orthogonal thereto adjoining these as described below. Face *sf* is cut out adjacent read-write gap $G_R$ along a segment *a*, to establish a prescribed reduced cross section of this Gap $G_R$, a most critical dimension (since it defines recording track width, etc.) as particularized below.

In accordance with the invention, it is preferred that core C–1 and legs L thereof be formed from a ferrite material (fabrication procedure is described below) as known in the art because such material is relatively hard, affords lower recording losses and superior operation at high frequencies and is relatively convenient to work, being, for instance, particularly more attractive than metallic which are much more difficult to fabricate, except with expensive methods and which tend to abrade and otherwise wear more rapidly, degrading their resolution and sensitivity characteristics of the head, etc., the ferrite being of high density and low porosity. The bonding agent may comprise a glass bond, an epoxy bond, or like material as known in the art. Although a separate spacer material is preferred here, in some instances, the glass or other bonding agent may itself, form the non-magnetic gap embedment since this can improve wear-resistance, gap-definition, resolution and sensitivity and minimize gap-erosion. The dimensions of embodiment C–1 are indicated below in Table I and may be found by reference to FIGS. 1, 2, 6 and 7 being somewhat more discussed below relevant to a preferred fabrication technique. Table I also includes dimensions of the typical prior art core in FIG. 3 for reference purposes.

TABLE I—CORE DIMENSIONS

Figure 2:
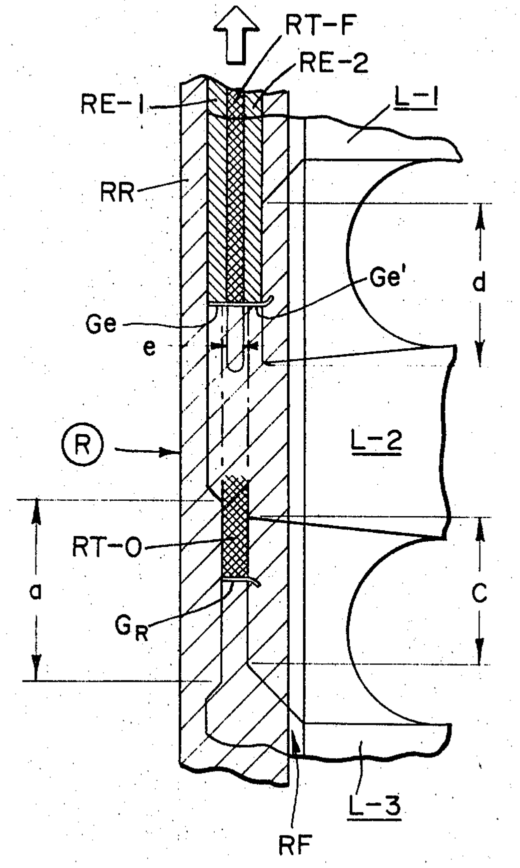
FIG. 2 is a very schematic plan view of the dual gap area of the core in FIG. 1 together with an illustrative representation of the magnetic information recorded thereby.
Figure 6:
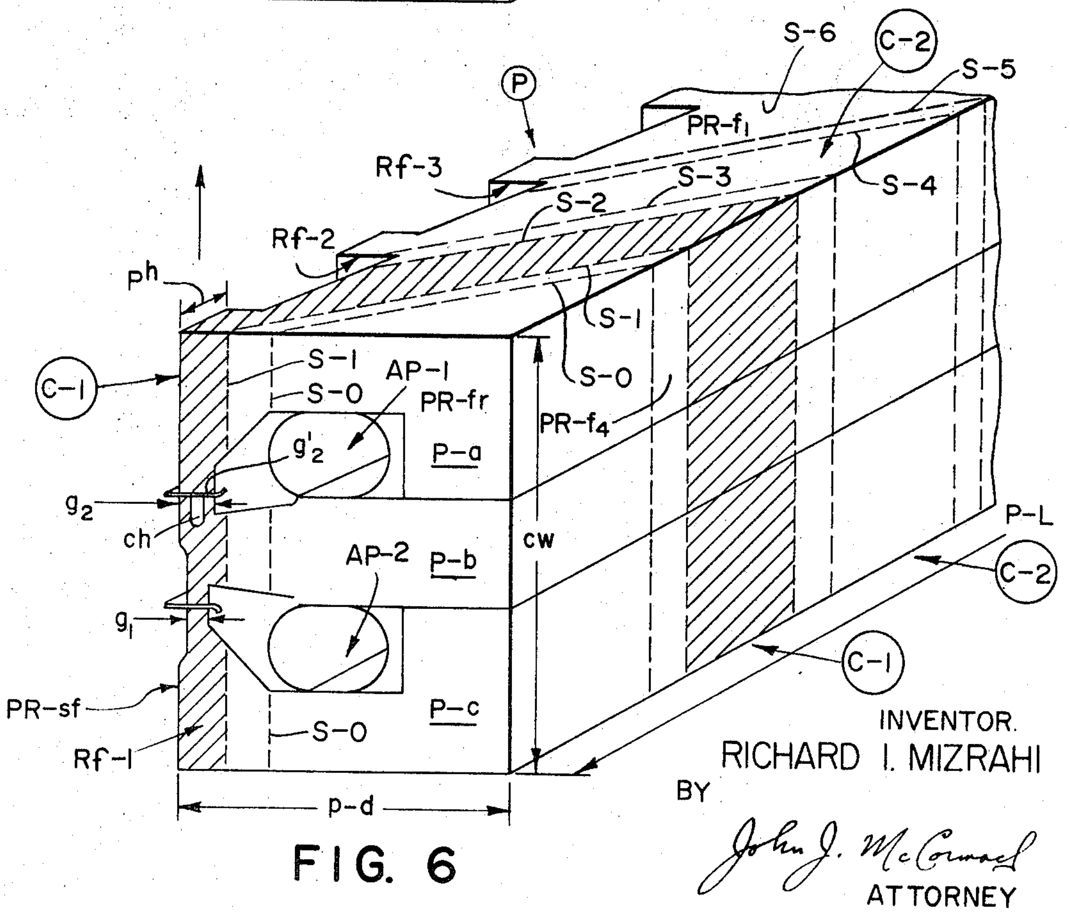
FIG. 6 is a side elevation of the profile (unexploded) in FIG. 5.

*a*—FIG. 1: 35 mils (+2); by 2 mils deep (+.4, −0.0) (after trimming flat)
*b*—FIG. 1: 12 or 15 mils (±2) (vs. FIG. 4)
*c*—FIG. 1: 20 mils
*d*—FIG. 1: 20 mils
*e*—FIG. 1: 5 mil (±1)
*p*H—FIG. 1: 15 mils (±1)—for multi-piece core; lap for pole height to about 7–10 mils in a head assembly
Pole width for Gap $G_R$—FIG. 2: 8 (±1) mils
Pole width for Gap $G_e$—FIG. 2: 3 (±1) mils
Pole width for Gap $G_e'$—FIG. 2: 3 (±1) mils
Tracks RFT—F, RE–1, RE–2: functions of two of many arbitrary variables
  *cd*—FIG. 1: 200 mils
  *cd*—FIG. 1: 200 mils
  cw—FIG. 1: —200 mils
  LE—FIG. 1: 28 mils
  WS—FIG. 7: 13 mils (±2)
  *f*—FIG. 7: 45 mils (cut on 60 mil centers)
  A°—FIG. 7: 45° (±1) (pref. range: ±10–15°)
  P–L—FIG. 6: 1.75 in. (for 25 cores like C–1)
Typical prior art core in FIG. 3:
  Width of gaps $AG_e$, $AG'_e$: 400 μin.
  Width of gap $AG_R$: 200 μin.
  $A_s$: about 45 mils
    $A_s$ about 45 mils
    AD: 2.35 mils (±1) by about 6–10 mils deep (cut at 22°)
    AW: about 12 mils
  $A_w'$: about 8 mils
    AP–3′: beveled at about 22° from recording face Workers in the art will appreciate that embodiment C–1 according to the invention provides a "slant core" transducer having the aforementioned and other valuable advantages in magnetic recording environments such as when used in a set of like cores to form a multi-track recording head for recording on magnetic disc records. It will be especially appreciated that this construction lends itself as particularized below, to the manufacture of a matched set of such cores, keeping the dimensions and orientation of the working magnetic surfaces in prescribed matching relation, yet doing so practically and economically. It will be apparent that the oblique relation of core legs L to recording face RF will be, in general, sufficient to accommodate the wrapping of the coils CL and preferably to accommodate the preferred fabrication technique described below, e.g. wherein the offset portion comprising the pole cross section (defined by faces RF, *sf*, *tf*, etc. may be conveniently machine-finished, allowing the side surfaces SS, SS′ of the legs to be cut without affecting a magnetic recording surface, etc. as described below). Of course workers in the art will appreciate that while this configuration is particularly suited and advantageous for a multi-gap core transducer and especially for fabricating a matched set thereof, it may be used where desired in other circumstances, such as for a single gap transducer, a three-gap transducer, etc.

FABRICATION PROCESS

The aforedescribed obliquely cantilevered core construction particularly lends itself to and is particularly adapted for a fabrication process to be described as follows with references to FIGS. 5 and 6. This process will generally relate to how a single profile P may be advantageously manipulated, finished, etc. according to another feature of the invention to manufacture obliquely cantilevered cores of the type aforedescribed and preferably a matched set thereof. Thus, it will be understood that three ferrite slabs P–*a*, P–*b*, P–*c* are each provided and shaped to respectively correspond in cross section to aforedescribed legs L–1, L–2, L–3 respectively. More particularly, each slab may be understood as formed from a ferrite material cut parallel lapped into a rectangular slab, having the six outer surfaces thereof, thoroughly polished as is conventional wtih a particularly fine polishing being provided on at least face PR–*fr* (to form the portion of the recording face $RF_1$—e.g. polished to yield an optically flat surface). The slabs P–*a*, P–*b*, P–*c* will have a thickness, cumulatively totalling the prescribed core width *cw* (see FIG. 1) and each have a long and short dimension P–L, P–*d* respectively sufficient to provide the desired thickness (LE) and length (*cd*) dimensions of the cores to be cut therefrom, this being readily ascertainable by means known in the art once the cutting angle $A^0$ is established (cf. FIG. 7 etc.).

Workers in the art can readily appreciate how to fabricate each of these slabs, for instance, so as to establish the prescribed indicated configuration of the common coil aperture AP–1, AP–2 paying particular attention to the flatness and orientation of the surfaces adjacent the magnetic transducer gaps (that is, the "pole tip surfaces" indicated in FIG. 2 generally). More particularly, those skilled in the art will appreciate that slabs P–*c* and P–*b* may be machined in common to a prescribed flatness along the abutting surfaces of the read-write gap $g_1$ so that when the cores are cut from profile P, these gap surfaces will be matched in the set of cores. (Here it should be prospectively appreciated that, in general, and to use this method most advantageously, a set of matched cores is to be sliced from profile P such as cores C–1 and C–2 exemplarily indicated in FIGS. 1 and 6. This, as particularized below, will be done only after the entire profile has been assembled and with the slabs bonded to one another and the external surfaces finished in common.) Similarly, the abutting gap surfaces for gap $g_2$ of slabs P–*a*, P–*b* may be finished and machined flat in common. It will appear of particular advantage, however, that this being done, the tunnel channel *ch* may then be cut in one of these gap surfaces as indicated simply by machining a groove down the surface of slab P–*b* to be common in orientation and dimensions for all the cores in the set. Workers in the art will probably appreciate immediately how very advantageous and convenient this is as opposed to prior art methods; in any event, this convenience will become more apparent below with respect to the description of alternative, more conventional and difficult methods as related to the configurations of FIGS. 3 and 4. Next, the spacer material will be inserted between the respective gap faces and the slabs held in place, conventionally, while the bonding agent BA is applied to maintain intimate contact both at these gaps and at the opposite (low-reluctance) mating surfaces as known in the art. The gap material may be quite conventional except that it should be nonferromagnetic (non-magnetizable).

The application of this spacer material and bonding of the slabs is well known in the art and need not be discussed. However, either during the bonding operation or prior thereto, and as a feature of convenience, channel *ch* may be filled (such as with bonding or other material; e.g. glass) so that, once the three slabs are bonded together into profile P, the channel will not present a void. The joined profile assembly P may now be lapped and polished as known in the art; for instance, lapping surface *sf* (critical since this finishing defines track dimensions)—some surfaces being finished after a core is severed from the profile P and inserted into a head assembly (e.g. RF).

Figure 5:
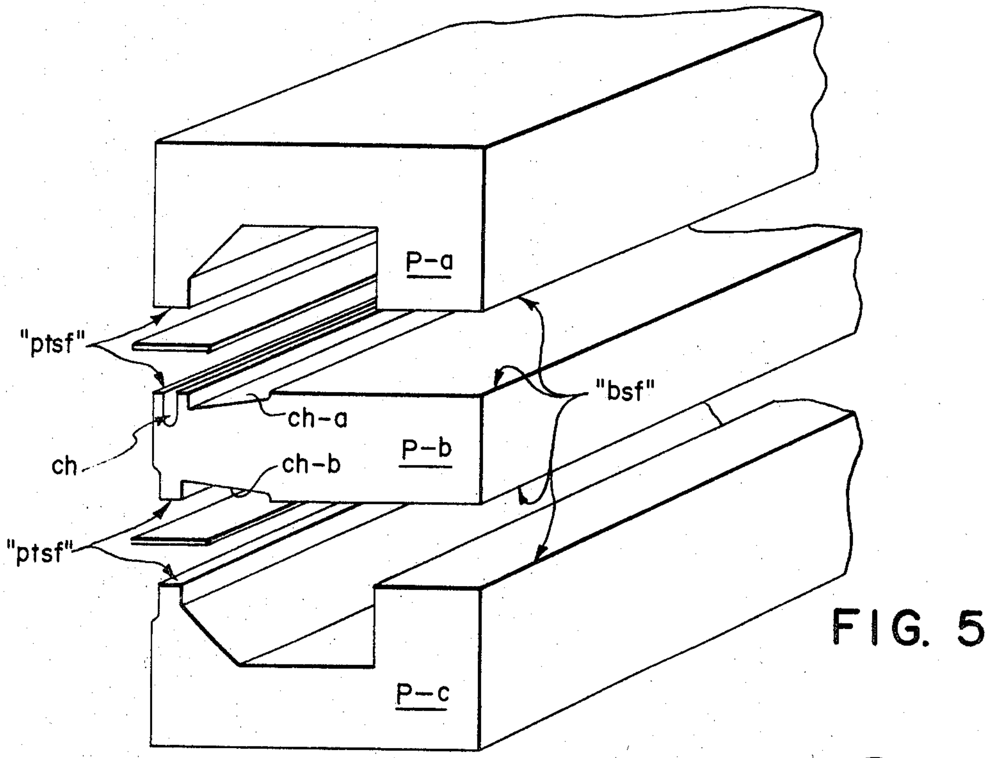
FIG. 5 is an exploded view of a multi-core "profile" from which a number of cores like that in FIG. 1 may be fabricated according to the invention.

FIG. 5 will indicate, in exploded view, a multi-core profile from which a number of cores like that in FIG. 1 may be fabricated according to the invention. As one feature it will be evident that each profile-part (e.g. P–*b*) is apt for the forming of fussy indentations (such as the tunneling indentation *ch*) with long, continuous machining strokes, these being easy to perform and control with precision, yet very convenient to render. Thus, it will be apparent that the parts shown exploded in FIG. 5 are intended to be bonded in an assembled, multi-core profile (such as indicated in FIG. 6 as bonded together) and from which individual cores may be sawn. It will be apparent to those skilled in the art that many other advantages result from this three-piece profile construction. For instance, the "pole tips" ("tips" in the conventional sense) may here be machined to resemble the desired track configuration, such as along edge segments *a*, *c* etc. of pieces P–*c*, P–*b*; before bonding into an integral profile.

With surface R*f*–1 as a reference, a prescribed number of pole height dimensions *ph* and separation dimensions *f* are marked off, one pair for each intended core to be sliced from profile P. Then grooves are cut along this side face PR–*sf* (FIG. 7) of profile P to a prescribed depth at each of these respective distances, that is, to define face *tf*–1 at distance *ph* and thereby establish pole height (gap height) of the first core. Along recording face R*f*–2 at distance *f* from face *tf*–1 lapping is performed to similarly define the recording face for the second core, continuing these markings and grooving operations until the respective recording and top faces for each prospective core (to be sawn from P) are formed. The depth of these faces will be indicated by the dimensions in Table I. The recording (gap-forming) cut-out (dimension *a* in FIG. 1) is, of course, preferably rendered along side face PR–*sf* in common for all the intended cores. However, preferably, as indicated in FIG. 6, the recording faces, such as R*f*–2, R*f*–3, etc. are cut somewhat deeper than necessary, in company with their opposing top face, to describe a particular undercut channel PC, with the undercut sufficient to accommodate misalignment of the associated, intersecting saw-cut, yet, without reducing the R*f* below the desired minimum length.

In any event, it will be apparent to those skilled in the art that the cutting of a top face (*tf*–1, for instance) must be very carefully and precisely formed so as to exactly define the respective gap height for that core (C–1)—and the invention accommodates this very, very conveniently. Similarly, the recording face R*f*–2 for core C–2 must be very exactly oriented and carefully finished since it is the recording surface. The invention facilitates this, while employing simple cutting strokes. Those skilled in the art will appreciate that unlike prior art techniques, the taught method allows "one-stroke" machining of a number of carefully-described pole tip surfaces in common, while the cores are still part of the profile P and before severing therefrom, thus allowing a great improvement in efficiency of handling and in exactly matching core orientation, dimensions, etc.

One advantage, according to the invention, is that very narrow track widths may be achieved by convenient machining operations, while the finished work itself (the core profile) is large and strong enough to be readily handled without the breakage typically associated with very thin, brittle parts (viz ferrite). This fabrication method also involves a more convenient method for producing the tunnel zone as opposed to prior art methods involving a narrow saw cut through one gap (refer to FIGS. 3 and 4 below)—such operations not only being otherwise difficult to control to precise dimensions (e.g. 5 mils or less), but involving extremely low yield and high expense since ferrite is such a brittle material to work.

As another, related feature of the invention, it will be noted that reduction of the read/write gap cross section (trimming of gap width) *a* (e.g. FIG. 1) can be effected most conveniently on profile P (cf. gap $g_1$, FIG. 5 and adjacent reduced pole-width) by a simple machining operation—one that may be precisely controlled and performed very conveniently; especially for a set of cores in common. By contrast, however, prior art fabrication techniques are much less desirable, typically involving a separate mechining operation, etc. at this area *after* the core is finally severed (e.g. for surfaces A*b*, A*b'* on core 3–C in FIGS. 3 and 4). Workers in the art will recognize the comparative degradation, in the prior art, of machining accuracy (especially for "matching" cores), in efficiency and ease of cutting, and in handling problems (e.g. the brittle ferrite core is much more likely to crack or chip).

According to another feature of the invention, also involving common matched fabrication operations on the profile P, parallel, 45° saw cuts (cf. slices indicated in FIG. 6) are made through the top face PR–$f_1$ of profile P, being adapted to so slice a set of matched cores C–1, C–2 etc. therefrom that the cut faces thereof will be relatively parallel and aligned, as well as like-dimensioned. More significantly, this is done without affecting the aforedescribed magnetic "pole tip surfaces," such as recording faces R*f*, top faces *tf*, or other surfaces associated with the gaps $g_1$, $g_2$. That is, for instance, a saw cut having a width "WS" of about 13 mils is rendered between limits S–1, S–2 to sever a block P–B*w* of waste material from profile P, thus intersecting face PR–*fr* of profile P without disturbing the associated recording face R*f*–1. Then, a parallel, similar 45° slice is made between limits S–3, S–4 to sever the initial core C–1 from profile P, this cut being made as before so that the associated recording face R*f*–2 of the next core (C–2) is not affected, (this cut establishing the width LE of core C–1). In a similar manner, the other parallel cuts indicated are made to sever, from profile P, the respective cores C–2, C–3 etc. to be matched and without interfering with the magnetic pole tip surfaces.

It will be apparent to those skilled in the art that so slicing cores from a bonded profile in a plane oblique to the profile cross section, is a new and advantageous technique in the art. It will be especially apparent that this dispenses with the "secondary machining" operations typically necessary in the prior art (i.e. operations after individual cores are severed) as well as eliminating such operations on pole tip magnetic surfaces, such as machining to adjust track dimensions or the like. That is, it will be recalled that in the prior art slicing of such cores, the slicing operation typically acts to define the limits of the recording face (analogous to face RF of core C–1) with a number of attendant disadvantages—such as dependence upon this rough sawing operation to render a carefully defined surface (typically necessitating a subsequent secondary lapping of the side surfaces of the individual core—a very inconvenient and expensive operation), as well as introducing misalignment and dimensional errors. It will be apparent to those skilled in the art that this feature of the invention may be characterized as interchanging the position of gap height with track width, such as by cutting cores obliquely from a profile which has been re-oriented accordingly.

Figure 3:
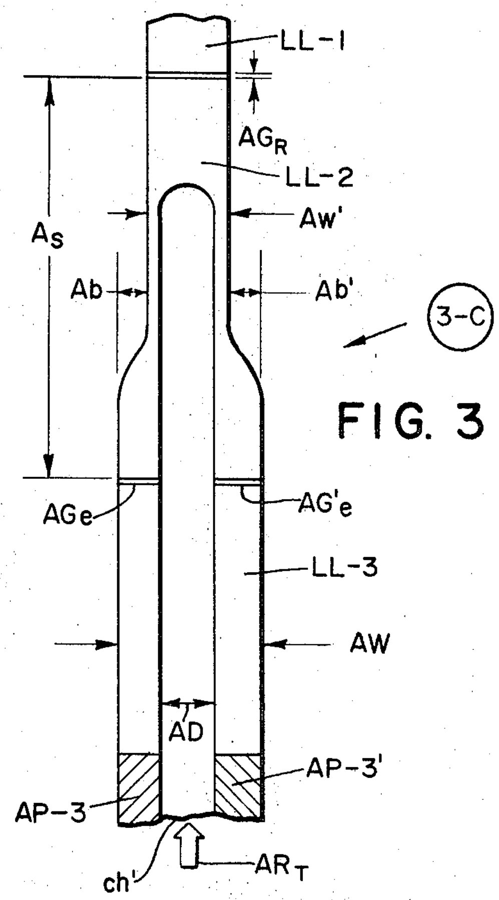
FIG. 3 is a plan view similar to FIG. 1 illustrating a more conventional, less preferable construction.
Figure 4:
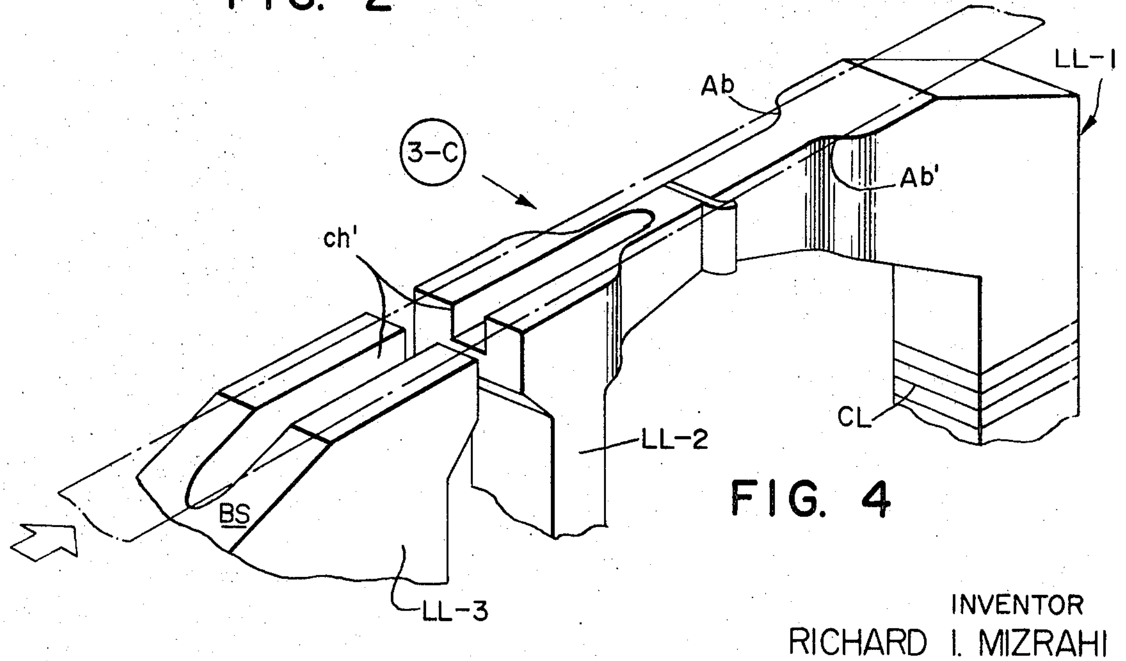
FIG. 4 is an isometric view of the elements in FIG. 3.

The novelty and advantages of the invention aforedescribed will become more apparent upon consideration of FIGS. 3 and 4 wherein an alternative, more conventional dual-gap "comparison-core" transducer "3–C" is schematically indicated, being understood as intended for roughly the same purpose as cores C–1 etc., but not having the obliquely cantilevered construction and thus involving different, less advantageous fabrication operations. "Comparison-core" 3–C will be seen as comprising three legs LL–1, LL–2, LL–3 functionally analogous to legs L–3, L–2, L–1, respectively, of core C–1 and defining analogous recording gap $AG_R$ and (tunnel) erase gaps $AG_e$, $AG'_e$. The dimensions of core 3–C are identified and exemplarily indicated in Table I. Another difference over the C–1 embodiment, and somewhat typical of prior art devices, is that the recording surface of leg LL–3 is beveled to fall away somewhat sharply (bevel surface BS about 22°) from the recording plane, as indicated in FIG. 4, for instance merely serving to reduce the depth of the tunnel cut (improve accuracy, facilitate notching) though this is optional.

Without the advantages of the prior described fabrication techniques according to the invention, it will be apparent that other techniques must be used here, for instance, to define the tunneling channel *ch'*. In this instance, since no convenient common finishing (e.g. sawing) operation on a single profile-surface is possible, the individual core 3–C must first be cut (e.g. from a bonded profile if one is to be used) and thereafter channel *ch'* routed-out, such as by sawing along the direction of the arrow into the beveled surface through the recording surface of leg LL–3 and into that of LL–2 a prescribed amount as indicated. It will be apparent to those skilled in the art without further discussion here that this is a very undesirable technique by comparison to that aforedescribed; besides being much, much less convenient and more expensive, and offering no real assurance of matching tunnel attitude and dimensions (as does the invention).

Those skilled in the art will appreciate that the aforedescribed invention has taught, among other things a new slanted (obliquely-cantilevered) core construction, together with associated fabrication techniques. It will be apparent that although these were described with reference to and with special advantage for the indicated dual gap (read-write gap and longitudinal tunnel erasing gap) transducers, it will be apt for other transducer arrangements to a greater or less degree. For instance, it may be applied for wide erase/narrow read, write transducers or wide write/narrow read transducers as known in the art. It may even be applied for single gap transducers although obviously the advantages derived and problems solved are not as significant.

Having now described the invention, what is claimed as new and novel and for which it is desired to secure by Letters Patent is:

1. A method of fabricating ferrite magnetic transducer cores comprising the steps of:

forming, from ferrite material, a profiled workpiece having an exterior surface, a channel within said workpiece with an interior surface spaced a predetermined distance from the exterior surface, and a gap extending from one surface to the other;

cutting a plurality of grooves each with at least one side face extending in one direction from the exterior surface through said gap into said channel; and slicing said profiled workpiece in a second direction so as to intersect each groove at a line beyond the interior surface to produce an individual core.

2. The method of claim 1 wherein non-corresponding side faces of adjacent grooves are cut so as to be separated by a predetermined dimension.

3. The method of claim 1 wherein said slicing is oblique to one of said surfaces.

4. A method of fabricating integral tunnel erase ferrite magnetic transducer cores comprising the steps of forming, from ferrite material, a profiled workpiece having an exterior surface, two channels within said workpiece each with an interior surface spaced a predetermined distance from the exterior surface, and two gaps each extending from a respective one of the interior channel surfaces to the exterior workpiece surface;

cutting a tunnel uniformly intersecting one of said gaps and parallel to the exterior surface along a line spaced less than the respective predetermined distance from the exterior surface;

cutting a plurality of grooves each with at least one side face extending in one direction from the exterior surface through said gaps into said channels; and slicing said profiled workpiece in a second direction so as to intersect each groove at a line beyond the innermost interior surface to produce an individual core.

5. The method of claim 4 wherein non-corresponding side faces of adjacent grooves are cut so as to be separated by a predetermined dimension.

6. The method of claim 4 wherein said slicing is oblique to one of said surfaces.

(References on following page)

References Cited

UNITED STATES PATENTS

| | | | |
|---|---|---|---|
| 3,246,383 | 4/1966 | Peloscheck et al. | 29—603 |
| 3,353,261 | 11/1967 | Bradford et al. | 29—603 |
| 3,395,451 | 8/1968 | Peloschek | 29—603 |
| 3,402,463 | 9/1968 | Bos et al. | 29—603 |

JOHN F. CAMPBELL, Primary Examiner

C. E. HALL, Assistant Examiner

U.S. Cl. X.R.

179—110.2